(12) United States Patent
Wangler

(10) Patent No.: US 9,924,831 B2
(45) Date of Patent: Mar. 27, 2018

(54) STRETCHABLE GRILL COVER

(71) Applicant: Eric J Wangler, Rochester, NY (US)

(72) Inventor: Eric J Wangler, Rochester, NY (US)

( * ) Notice: Subject to any disclaimer, the term of this patent is extended or adjusted under 35 U.S.C. 154(b) by 139 days.

(21) Appl. No.: 14/968,414

(22) Filed: Dec. 14, 2015

(65) Prior Publication Data

US 2016/0183727 A1    Jun. 30, 2016

Related U.S. Application Data

(60) Provisional application No. 62/098,791, filed on Dec. 31, 2014.

(51) Int. Cl.
   *A47J 37/00* (2006.01)
   *A47J 37/07* (2006.01)

(52) U.S. Cl.
   CPC .................. *A47J 37/0786* (2013.01)

(58) Field of Classification Search
   CPC .................................................. A47J 37/0786
   USPC ....................................................... 150/165
   See application file for complete search history.

(56) References Cited

U.S. PATENT DOCUMENTS

| | | | |
|---|---|---|---|
| 1,820,040 A | 8/1931 | Zuckerman | |
| 2,498,113 A | 2/1950 | Milner | |
| 2,812,900 A | 11/1957 | Matthews | |
| D290,678 S | 7/1987 | Johnson et al. | |
| 4,789,019 A | 12/1988 | Sweetser et al. | |
| 4,944,340 A * | 7/1990 | Tortorich | B60R 9/055 150/167 |
| 5,603,132 A | 2/1997 | Zafiroglu | |
| 5,636,393 A | 6/1997 | Zafiroglu et al. | |
| 6,003,451 A | 12/1999 | Kelldorf | |
| 6,842,921 B1 | 1/2005 | Tsiarkezos et al. | |
| 6,863,100 B2 * | 3/2005 | Neal | A47J 37/0786 150/154 |
| 7,152,733 B2 * | 12/2006 | Trickett | A47J 37/0786 135/126 |
| 7,866,358 B1 * | 1/2011 | Simms, II | A47J 37/0786 126/201 |
| 2005/0066957 A1 * | 3/2005 | MacLean | A47J 37/0786 126/201 |
| 2005/0205180 A1 * | 9/2005 | Goudeau | A47J 37/0786 150/154 |
| 2006/0130532 A1 * | 6/2006 | Chuang | D04B 1/18 66/198 |
| 2014/0113044 A1 * | 4/2014 | McIntire | A47J 37/0786 426/416 |
| 2014/0345760 A1 * | 11/2014 | Saggau | B60J 11/06 150/167 |
| 2015/0000002 A1 * | 1/2015 | Brown | A42B 1/12 2/68 |
| 2015/0075684 A1 * | 3/2015 | Simon | A47J 37/0786 150/165 |

* cited by examiner

*Primary Examiner* — Sue A Weaver
(74) *Attorney, Agent, or Firm* — John C. McMahon

(57) ABSTRACT

A grill cover that is rain-impermeable and reversibly stretchable, and formed of a dual-layer sheet. The cover is substantially stretchable to a size sufficient to cover a grill, such as a gas grill. Rain runs off of the installed cover, while condensation on the grill evaporates through the sheet without absorbing to the sheet.

9 Claims, 2 Drawing Sheets

STRETCHABLE GRILL COVER

CROSS-REFERENCE TO RELATED APPLICATIONS

This application claims priority to U.S. Provisional Application No. 62/104,152, filed Jan. 16, 2015, which is incorporated herein by reference in its entirety.

BACKGROUND OF THE INVENTION

Grill covers are well-known and in widespread use. Conventional grill covers are generally effective for covering and protecting grills, but are undesirable for several reasons. For example, many grill covers are unwieldy and difficult to operate because they blow off and prevent access to the propane area and storage cabinet. Conventional grill covers are constructed of soft fabric sewn into a structure that should conform to the gill's shape. Conventional grill covers are designed to fit one size grill only. Since the fabric is soft, it folds upon itself, making it difficult for the operator to determine the correct orientation for placing the cover over the grill. In another example, the grill cover fabric is heavy, cumbersome, difficult to store while grilling, and non-porous, which causes moisture from condensation or rain to be retained under the cover. The grill covers are not UV-resistant and deteriorate within a few years. The retained moisture contacts the grill, which eventually leads to rust on the grill and its components accelerating the grill's deterioration.

In light of the foregoing deficiencies and others associated with convention grill covers, a need has been identified for a novel and unobvious grill cover device that overcomes the noted deficiencies and others while providing better overall results.

SUMMARY OF THE INVENTION

Grills have a variety of components that are sensitive to wet weather. Accordingly, it is essential to cover such grills when not in use, so as to protect them from the elements and extend their life. The present invention is directed toward an elastic grill cover for covering such grills. The sack-like grill cover has a relaxed, un-stretched, state, which is convenient for folding and storing the cover. To use, the operator simply opens the cover and stretches it over the top of the grill. The cover opening is elasticized, so that is conforms to the grill. Rain falling on the grill cover does not penetrate the cover. Instead, the rain sheets or runs off of the cover, so that the grill components do not get wet. Additionally, the cover is water vapor-permeable, so that moisture that happens to condense under or inside of the cover evaporates through the cover. To use the grill, the operator removes the cover, which shrinks and substantially recovers its original size and shape. If desired, the operator can fold the cover up for storage.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
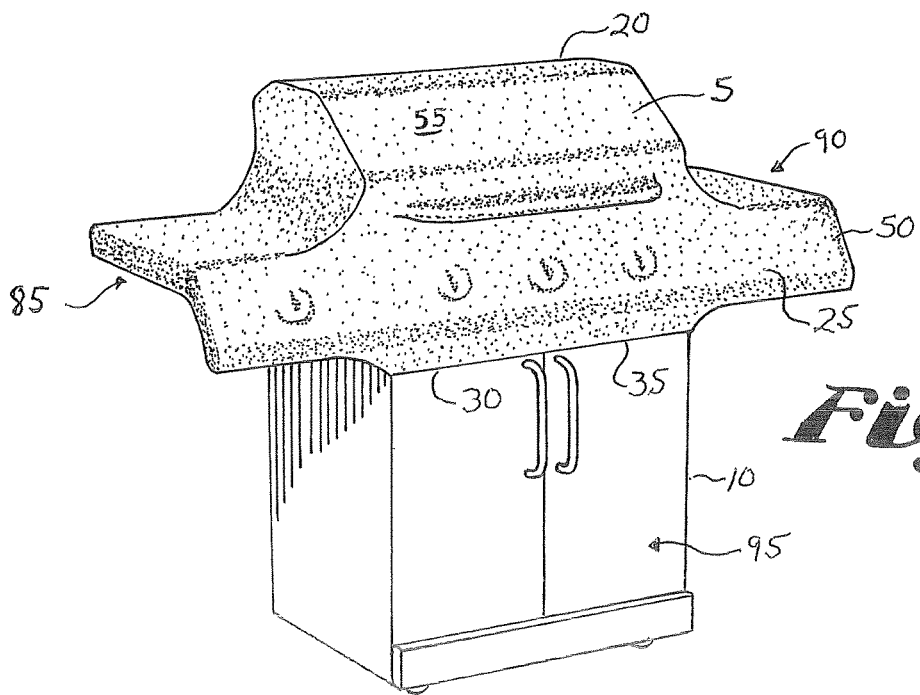
FIG. 1 is a perspective view of a gas grill covered with the grill cover of the present invention, wherein the grill cover is stretched so as to fit over and cover the top of the grill.
Figure 2:
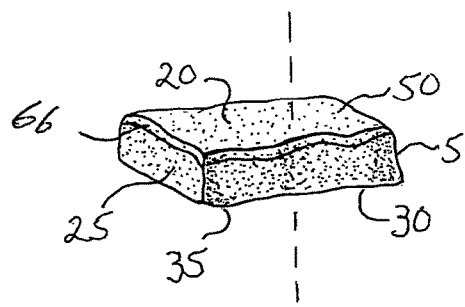
FIG. 2 is a perspective view of the grill cover of FIG. 1, wherein the grill cover is un-stretched and folded.
Figure 3:
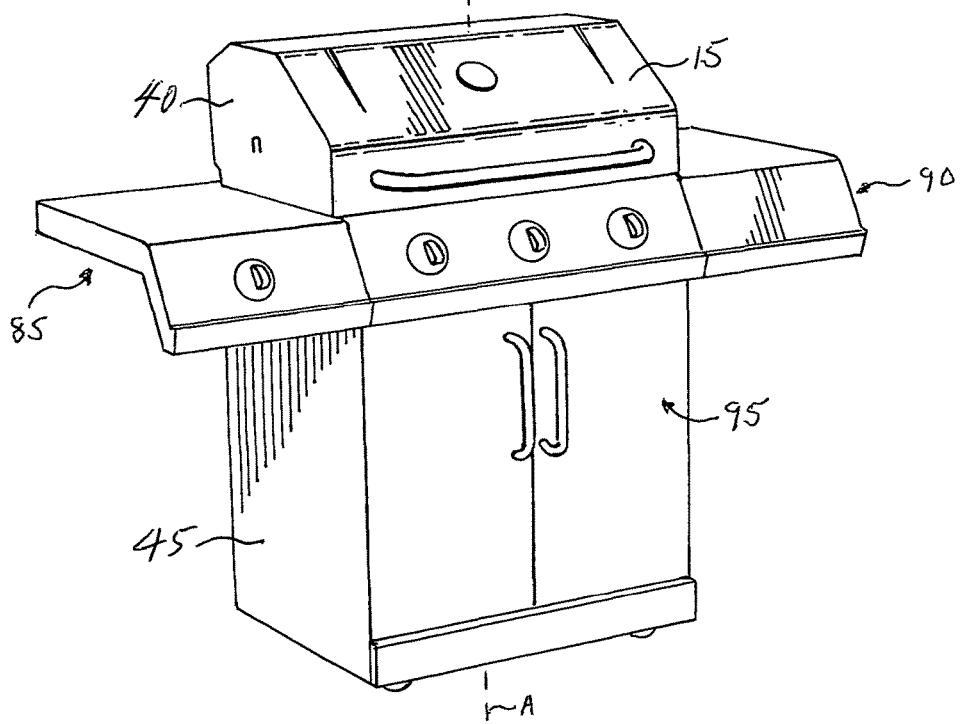
FIG. 3 is a top plan view of the covered gas grill of FIG. 1.
Figure 3:
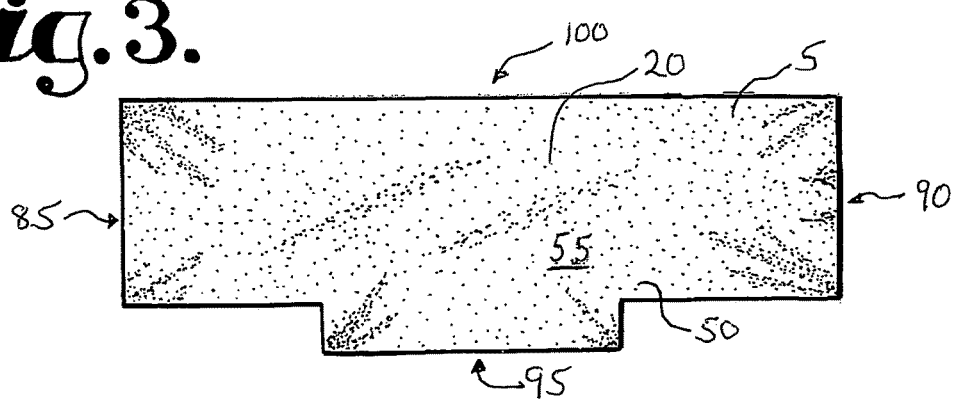

Referring now to FIGS. 1-4, the present invention is directed to a rain-proof cover, cowl or drape, denoted by the numeral 5, for covering a grill 10, such as a charcoal or gas grill. The cover 5 is constructed or fabricated of a stretchy, water-proof, UV-resistant material that stretches or expands to a size sufficient to cover the grill 10 and then recovers its original shape and size upon removal from the grill 10. As shown in FIGS. 1-3, the cover 5 is bag-like and includes a top portion 20, a side portion 25 and an interior (not shown) or chamber. The lower edge 30 of the side portion 25 defines an opening 35 that provides access to the cover interior so that the grill 5 can be received into the cover interior. An elastic band (not shown) or cinch type is sewn next to or adjacent to the cover opening 35, so that the cover opening 35 closes, contracts or snugs up against the grill 10, so as to prevent wind from blowing the cover 5 off of the gill 10. The cover 5 does not include or require a supportive frame, such as is used in some grill covers known in the art.

As shown in FIG. 2, the cover 5 is provided in an un-stretched or relaxed state, and may be folded. To use the cover 5, the operator stretches the cover 5 over the upper portion 40 of the grill 10 (see FIGS. 1 and 3). The cover 5 generally conforms to the grill upper portion 40 (see FIGS. 1 and 3). When installed and covering the grill 10, the cover 5 protects the grill 10 from UV light and precipitation, such as rain, fog and melting snow and ice, while enabling condensation under the cover 5 to evaporate therethrough. Grills 10 of numerous shapes and sizes are known, and it if foreseen that a cover 5 can be shaped and sized so as to be sufficiently stretchable so as to cover each of those grills 10. Since the cover 5 is stretchable, it is foreseen that the cover 5 can be sized and shaped to stretch and cover at least two different grills 10 or a range of similarly sized and shaped grills 10. While in the illustrated embodiment, the cover 5 covers only the operational upper portion 40 of the grill 10 (i.e., the burners and the electronic components) but not the grill lower portion, base or legs 45, thus allowing access to the propane and storage cabinets below. It is foreseen that the cover 5 can be sized and shaped to cover the entire grill 5.

Figure 4:
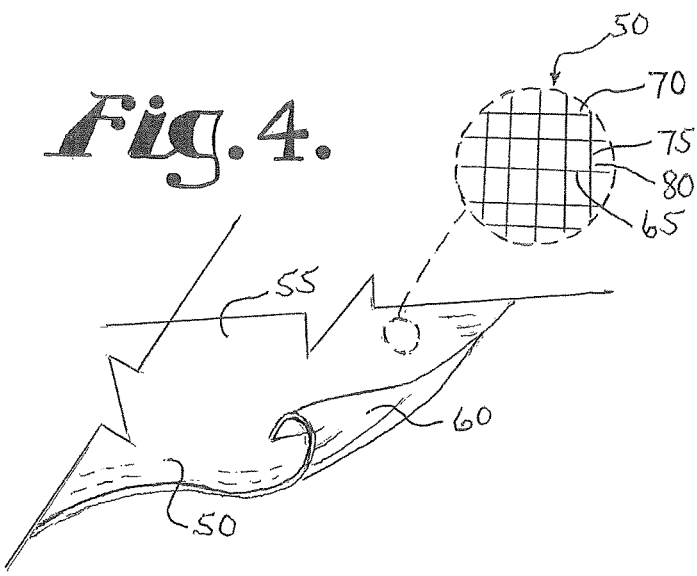
FIG. 4 is a perspective view of a portion of the fabric of the grill cover of FIG. 1, with a close-up view illustrating the weave of the fabric.

The grill cover 5 is constructed or formed of a reversibly stretchable sheet 50 with upper and lower surfaces, 55 and 60 respectively (see FIG. 4). When the sheet 50 is constructed into the cover 5 (i.e., cut and sewn), the upper surface 55 faces outwardly and the lower surface 60 forms, defines or provides the cover interior (not shown) that contains and contacts the grill 5.

The sheet 50 includes two layers, a fabric layer 65 (FIG. 4) and a polymer-film layer 66 (FIG. 2). The fabric 65 is formed of a plurality of warp threads, or yarns, 70 woven together with a plurality of weft threads, or yarns, 75. It is foreseen that the fabric 65 could be knitted instead of woven. The polymer-film layer 66 is attached to the fabric layer 65. For example, the polymer film 66 could be bonded or fused to the fabric 65. In another example, the polymer film 66 could be directly formed onto the fabric first layer using methods known in the art. In yet another example, the polymer film 66 penetrates and surrounds fabric layer 65. The polymer film 66 renders the sheet 50 rain resistant or water proof while remaining permeable to water vapor so that condensation caught under the grill cover 5 can evaporate through the cover and thereby protect the grill from rusting.

The fabric 65 is primarily formed of a stretch polyester or polyester-polyurethane copolymer material, such as are known by the trade names Lycra, Lycra spandex, Spandex or Elastane. Spandex makes the cover 5 light weight and UV resistant. A polyurethane coating or film 66 is foreseen to be added to the cover to make the cover both water and puncture resistant. The cover 5 hugs the grill with a built-in elastic band (not shown) to minimize the possibility of the cover 10 blowing off of the grill.

Spandex is formed of polyester and nylon fibers, threads or yarns, such as warp and weft threads 70 and 75 (FIG. 4), woven together in a number of ratios. Commonly, the ratio is about 8-20% nylon fiber with the rest being polyester fiber (i.e., 80-92%). These ratios generate varying amounts of stretch and recovery. For example, fabrics woven of spandex typically stretch in near equal amounts in both the warp and weft directions. In the warp direction, the threads 70 (FIG. 4) run the length of the fabric 65. In the weft direction, the threads 75 run across the width of the fabric 65. It is not uncommon for a spandex fabric to have a biaxial stretch of 150% of its original size. Recovery, the ability of the stretched fabric 65 to return to its original shape and size, is typically 100% of the maximum amount the fabric 65 is stretched. The individual fibers of Spandex are generally hydrophobic. Therefore, instead of absorbing moisture, water may pass between the threads 70, 75 of the fabric 65 or through spaces 80 formed or provided by the threads 70, 75. As is known in the art, polyurethane films have spaces (not shown) between the molecules that are large enough for molecules of water vapor to pass through, such as from one side of the film to the other. Accordingly, rain will not penetrate the cover 5, but condensation formed in the interior of the cover 5 is no longer trapped; the water vapor evaporates or passes through the cover 5, thereby keeping the grill 10 dry and prolonging the life the components of the grill 10.

To make the fabric 65 water-proof, a very thin film 66 of molten polyurethane is extruded and pressed onto the fabric 65. The polyurethane film 66 permanently adheres to the fabric 65. When the fabric 65 has the polyurethane film 66 applied thereto, the stretch of the fabric 65 is lowered to about 15-25% in the warp direction (i.e., parallel with the warp threads 70) and 30-40% in the weft direction (i.e., parallel with the weft threads 75). This stretching is reversible. With regard to these reductions in stretch, the difference between the warp threads 70 and the weft threads 75 is caused by the polymer alignment of the polyurethane molecules when applied to the fabric 65. Generally, spandex fabric is manufactured into rolls that are roughly six feet wide and hundreds of feet long. To apply the polyurethane film 66 to the fabric 65, the fabric 65 is fed through a machine (not shown) that applies the polyurethane film 66 through a narrow gap nozzle that is six feet wide. The polyurethane molecules align in the direction of flow, which in the illustrated embodiment, the vast majority of the polyurethane molecules align themselves in the warp direction (i.e., parallel with the warp threads 70).

The cover pattern, which is used to cut out the fabric 65, is strategically designed such that the fabric 65 is oriented specific to desired direction of performance. In particular, the cover 5 must stretch far more from the grill left side, generally 85, to the grill right side, generally 90, and over the grill 10 than from the grill front, generally 95 to the grill back, generally 100 (see FIGS. 1 and 3). Since the fabric 65 stretches more in the weft direction, the fabric 65 is cut such that the weft threads 75 run left to right with respect to the grill 10.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention. It is to be understood that while certain forms of the present invention have been illustrated and described herein, it is not to be limited to the specific forms or arrangement of parts described and shown.

What is claimed and desired to be secured by Letters Patent is as follows:

1. A grill cover device comprising:
    a) a rain-impermeable stretchable sheet with upper and lower surfaces and an inner chamber; wherein
    b) the sheet is stretchable to a size sufficient to receive a grill into the chamber; and
    c) water vapor passes through the sheet substantially without absorption thereinto.

2. The grill cover according to claim 1, wherein the sheet is reversible.

3. A grill cover device comprising:
    a) a reversibly stretchable drape including
        I) a woven spandex fabric; and
        ii) a thin polyurethane film bonded to the fabric; wherein
    b) the drape is expandable to a size sufficient to substantially cover a grill; and
    c) the drape is substantially permeable to water vapor.

4. A grill cover device comprising:
    a) a rain-impermeable stretchable sheet with upper and lower surfaces and an inner chamber;
    b) the sheet being stretchable to a size sufficient to receive a grill into the chamber;
    c) the sheet including a first layer and a second layer;
        I) the first layer being a fabric formed of a plurality of warp threads woven together with a plurality of weft threads; and
        ii) the second layer including a polymer film attached to the first layer, the polymer film being permeable to water vapor; and
    d) the fabric of the sheet being of such a character that water vapor passes through the sheet substantially without absorption thereinto.

5. The grill cover according to claim 4, wherein:
    a) the warp threads reversibly stretch an amount of between about 15% and about 25%; and
    b) the weft threads reversibly stretch an amount of between about 30% and about 40%.

6. The grill cover according to claim 4, wherein:
a) the warp threads reversibly stretch an amount of at least 15%; and
b) the weft threads reversibly stretch an amount of at least 30%.

7. The grill cover according to claim 4, wherein the fabric comprises:
a) the sheet includes a biaxial stretch of about 150% of its original size.

8. The grill cover according to claim 4, wherein:
a) the warp threads are spandex; and
b) the weft threads are spandex.

9. The grill cover according to claim 4, wherein:
a) the polymer film is a polyurethane film.

* * * * *